(12) United States Patent
Wang (10) Patent No.: US 10,324,332 B2
(45) Date of Patent: Jun. 18, 2019

(54) DISPLAY PANEL AND MANUFACTURING METHOD THEREOF, AND DISPLAY DEVICE

(71) Applicant: BOE TECHNOLOGY GROUP CO., LTD., Beijing (CN)

(72) Inventor: Yingtao Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 65 days.

(21) Appl. No.: 15/535,427

(22) PCT Filed: Jan. 3, 2017

(86) PCT No.: PCT/CN2017/000042
§ 371 (c)(1),
(2) Date: Jun. 13, 2017

(87) PCT Pub. No.: WO2017/181732
PCT Pub. Date: Oct. 26, 2017

(65) Prior Publication Data
US 2018/0275459 A1    Sep. 27, 2018

(30) Foreign Application Priority Data

Apr. 22, 2016 (CN) .......................... 2016 1 0255493

(51) Int. Cl.
*G02F 1/1335* (2006.01)
*G02F 1/1337* (2006.01)
(Continued)

(52) U.S. Cl.
CPC ......... *G02F 1/133528* (2013.01); *G02B 6/00* (2013.01); *G02F 1/1362* (2013.01);
(Continued)

(58) Field of Classification Search
CPC ......... G02F 1/133528; G02F 1/133509; G02F 1/133753; G02F 1/133788; G02F 2001/133548
See application file for complete search history.

(56) References Cited

U.S. PATENT DOCUMENTS 7,630,030 B2    12/2009  Jang et al.
8,147,906 B2     4/2012  Wang et al.
(Continued)

FOREIGN PATENT DOCUMENTS

CN    1716055 A    1/2006
CN   101271170 A   9/2008
(Continued)

OTHER PUBLICATIONS

Search Report for International Application No. PCT/CN2017/000042 dated Apr. 1, 2017.
(Continued)

*Primary Examiner* — Thanh Nhan P Nguyen
(74) *Attorney, Agent, or Firm* — Calfee, Halter & Griswold LLP (57) ABSTRACT

Embodiments of the present disclosure relates to a display panel includes a first substrate and a second substrate facing the first substrate; a first polarizer provided on the first substrate; and a second polarizer provide on the second substrate, wherein the display panel includes a plurality of pixels, the first polarizer and the second polarizer have a plurality of light transmission axes, a direction of the light transmission axis of the first polarizer or the second polarizer corresponding to one pixel is different from that of the first polarizer or the second polarizer corresponding to a pixel adjacent to said one pixel, and the direction of the light transmission axis of the first polarizer and the direction of
(Continued)

the light transmission axis of the second polarizer corresponding a same pixel are perpendicular to each other.

20 Claims, 4 Drawing Sheets (51) Int. Cl.
*G02F 1/1343* (2006.01)
*G02F 1/1362* (2006.01)
*G02B 6/00* (2006.01)

(52) U.S. Cl.
CPC .. *G02F 1/133509* (2013.01); *G02F 1/133753* (2013.01); *G02F 1/134309* (2013.01); *G02F 1/133788* (2013.01); *G02F 2001/133531* (2013.01); *G02F 2001/133538* (2013.01); *G02F 2001/133548* (2013.01); *G02F 2001/133738* (2013.01); *G02F 2001/133749* (2013.01); *G02F 2201/123* (2013.01)

(56) References Cited

U.S. PATENT DOCUMENTS

| | | | |
|---|---|---|---|
| 8,149,354 | B2 | 4/2012 | Ojima et al. |
| 2006/0001798 | A1 | 1/2006 | Jang et al. |
| 2009/0273744 | A1 | 11/2009 | Wang et al. |
| 2010/0271575 | A1 | 10/2010 | Ojima et al. |

FOREIGN PATENT DOCUMENTS

| | | |
|---|---|---|
| CN | 101487956 A | 7/2009 |
| CN | 101644843 A | 2/2010 |
| CN | 105700224 A | 6/2016 |
| KR | 20140048705 A | 4/2014 |

OTHER PUBLICATIONS

First Office Action for Chinese Patent Application No. 201610255493.2 dated Jun. 5, 2018.

Fig. 7

DISPLAY PANEL AND MANUFACTURING METHOD THEREOF, AND DISPLAY DEVICE

CROSS REFERENCE

The present application is based upon International Application No. PCT/CN2017/000042, filed on Jan. 3, 2017, which is based upon and claims priority to Chinese Patent Application No. 201610255493.2, filed on Apr. 22, 2016, and the entire contents thereof are incorporated herein by reference.

TECHNICAL FIELD

Embodiments of the present disclosure relate to the field of display technology, in particular, to a display panel and a manufacturing method thereof, and a display device.

BACKGROUND

Thin film transistor liquid crystal display (TFT-LCD) is a major flat panel display (FPD). The TFT-LCD is more and more popular in the field of high-performance display field because of its characteristics of small size, low power consumption, radiation free and low production cost.

A TFT-LCD includes a first substrate (e.g., an array substrate), a second substrate (e.g., a color film substrate) and a liquid crystal (LC) layer interposed between the first substrate and the second substrate. The first substrate is provided with a TFT array, and the second substrate is provided with a color filter and a black matrix. An upper polarizer is provided on the second substrate, and a lower polarizer is provided on the first substrate. Light transmission axes of the upper polarizer and the lower polarizer are orthogonal. According to different directions of the electric field driving the LC, the TFT-LCD may be classified into a vertical electric field type and a horizontal electric field type. In the vertical electric field type TFT-LCD, a pixel electrode may be formed on the first substrate and a common electrode may be formed on the second electrode. In the horizontal electric field type TFT-LCD, both the pixel electrode and the common electrode may be formed on the array substrate.

It should be noted that, information disclosed in the above background portion is provided only for better understanding of the background of the present disclosure, and thus it may contain information that does not form the prior art known by those ordinary skilled in the art.

SUMMARY

Embodiments of the present disclosure provide a display panel and a manufacturing method thereof, and a display device.

According to an embodiment of the present disclosure, there is provided a display panel comprising: a first substrate and a second substrate facing the first substrate; a first polarizer provided on the first substrate; and a second polarizer provide on the second substrate, wherein the display panel comprises a plurality of pixels, the first polarizer and the second polarizer have a plurality of light transmission axes, a direction of the light transmission axis of the first polarizer or the second polarizer corresponding to one pixel is different from that of the first polarizer or the second polarizer corresponding to a pixel adjacent to said one pixel, and the direction of the light transmission axis of the first polarizer and the direction of the light transmission axis of the second polarizer corresponding a same pixel are perpendicular to each other.

According to another embodiment of the present disclosure, there is provided a display device comprising any one of the above display panel and a backlight module provided under the display panel.

According to a further embodiment of the present disclosure, there is provided a method for manufacturing a display panel comprising a plurality of pixels, the method comprising: forming a first substrate and a second substrate, respectively; forming a first polarizer and a second polarizer on the first substrate and the second substrate, respectively, wherein the first polarizer and the second polarizer have a plurality of light transmission axes, a direction of the light transmission axis of the first polarizer or the second polarizer corresponding to one pixel is different from that of the first polarizer or the second polarizer corresponding to the pixel adjacent to said one pixel, and the direction of the light transmission axis of the first polarizer and the direction of the light transmission axis of the second polarizer corresponding a same pixel are perpendicular to each other; and coupling the first substrate and the second substrate to each other.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

In order to more clearly illustrate the technical solutions in embodiments of the present disclosure, the following drawings to be used in the description of the embodiments will be briefly introduced below. Apparently, the drawings in the following description are only provided for describing selected embodiments, and are not all possible implementations. The drawings are not provided for limiting the scope of the present disclosure. In the drawings.

Throughout each figure of the drawings, corresponding reference numerals denote corresponding parts or features.

DETAILED DESCRIPTION

Exemplary embodiments of the present disclosure will now be described fully with reference to the drawings, such that objectives, technical solutions and advantages of the embodiments of the present disclosure will become more apparent.

Figure 1:
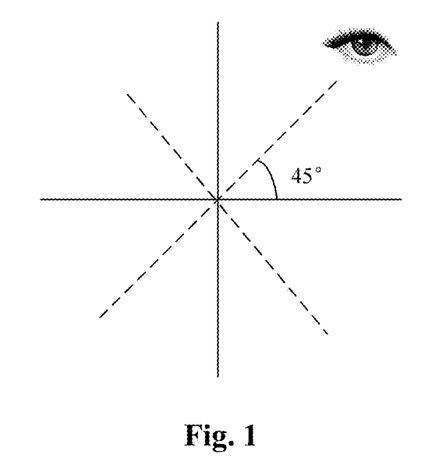
FIG. 1 schematically illustrates each orientation of the viewer.

As described above, directions of light transmission axes of the upper polarizer and the lower polarizer of the TFT-LCD are perpendicular. While viewing the display device, a significant quality difference of the image may be found between a front view and a side view while changing the orientation (i.e., the viewing angle) from the front of the display device to a side of the display device. Particularly, the display quality is worst when viewed at angles of 45°, 135°, 225° and 315° as illustrated in FIG. 1. This is mainly caused by the optical properties of LC molecules. In particular, the refractive index and the optical path of the LC molecules are different at different orientations and thus the degree of rotation of the light due to the LC molecules is also different. Accordingly, the upper polarizer and the lower polarizer have different occlusion of light at different orientations. From the perspective of the viewer, light leakage may occur while viewing from the side, resulting in quality uniformity of the image at different orientations.

An embodiment of the present disclosure provides a display panel comprising: a first substrate and a second substrate facing the first substrate; an LC layer interposed between the first substrate and the second substrate; a first polarizer provided on the first substrate; and a second polarizer provide on the second substrate. The first polarizer and the second polarizer have a plurality of light transmission axes, a direction of the light transmission axis of the first polarizer or the second polarizer corresponding to one pixel is different from that of the first polarizer or the second polarizer corresponding to the pixel adjacent to said one pixel, and the direction of the light transmission axis of the first polarizer and the direction of the light transmission axis of the second polarizer corresponding a same pixel are perpendicular to each other.

It should be appreciated that the LC layer comprises a plurality of LC molecules, and when the first polarizer and the second polarizer have a plurality of light transmission axes, it is possible to correspondingly adjust the orientations of the LC molecules in the LC layer, such that the LC molecules in the same layer have different orientations. As will be described in detail hereinafter, a relation between the orientation of the LC molecules and the direction of the light transmission axis of the polarizer may be also different due to different implementing principles of different types of display panel.

In this embodiment, as described above, the first polarizer and the second polarizer have a plurality of light transmission axes in different directions, and the directions of the light transmission axes of the first polarizer or the second polarizer corresponding to adjacent pixels may be different. That is, each pixel corresponds to a direction of a light transmission axis, and adjacent two pixels correspond to the light transmission axes in different directions. While viewing at different orientations, the viewer may see substantially the same image effect, thereby solving the problem that a significant quality difference of the image may be found from different orientations.

It should be noted that in the present disclosure, the "orientation of the LC molecules" refers to the orientation of the LC molecules when no voltage is applied thereto. In addition, the "direction of the light transmitting axis" refers to the polarizing direction of a natural light after passing through the polarizer.

Figure 2:
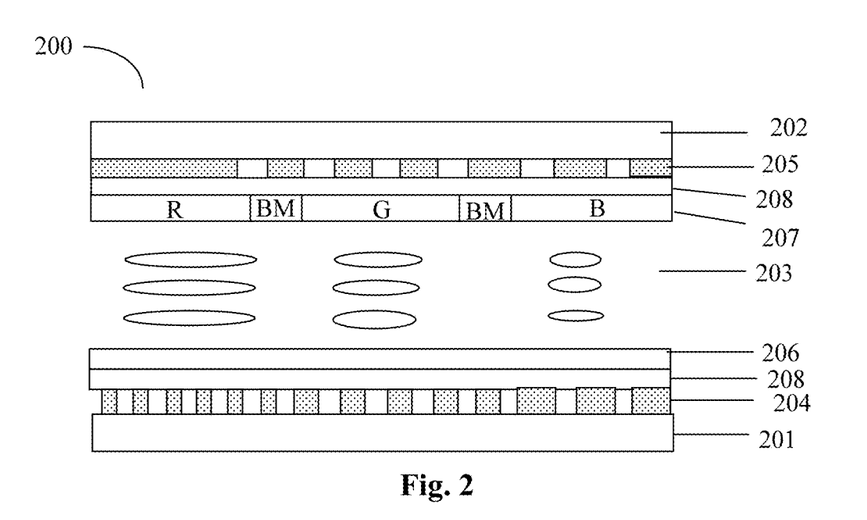
FIG. 2 schematically illustrates a cross sectional view of the display panel according to a first embodiment of the present disclosure.

FIG. 2 schematically illustrates a cross sectional view of the display panel 200 according to a first embodiment of the present disclosure.

As illustrated in FIG. 2, the display panel 200 comprises at least a first substrate (e.g., a lower substrate) 201, a second substrate (e.g., an upper substrate) 202 facing the first substrate 201, an LC layer 203 interposed between the first substrate 201 and the second substrate 202, a first polarizer (e.g., a lower polarizer) 204 provided on a side of the first substrate 201 adjacent to the LC layer 203, and a second polarizer (e.g., an upper polarizer) 205 provided on a side of the second substrate 202 adjacent to the LC layer 203. Both the first polarizer 204 and the second polarizer 205 have a plurality of light transmission axes in different directions, a direction of the light transmission axis of the first polarizer 204 and the direction of the light transmission axis of the second polarizer 205 corresponding a same pixel are perpendicular to each other, and the directions of the light transmission axes of the first polarizer 204 or the second polarizer 205 corresponding to adjacent two pixels are different.

With this configuration, throughout the display panel, the first polarizer 204 and the second polarizer 205 have a plurality of light transmission axes in different directions, thereby preventing the problem that the viewer may get a relatively good picture in front of the panel while may get a relative poor picture at a side of the panel, thus improving quality difference of the image at different orientations. Moreover, in the present embodiment, by providing the first polarizer 204 and the second polarizer 205 on the inner sides of the first substrate 201 and the second substrate 202, it is possible to reduce problems such as L0mura defect of the display panel, and meanwhile further reduce light leakage.

In the present embodiment, the display panel 200 further comprises a thin film transistor (TFT) array layer 206 comprising a plurality of TFTs, and the TFT array layer 206 is formed on the first substrate. More particularly, as illustrated in FIG. 2, the TFT array layer is formed on a side of the first polarizer adjacent to the LC layer, and an insulation layer 208 is interposed between the TFT array layer and the first polarizer. The display panel 200 further comprises a color film layer 207 provided on the second substrate. More particularly, the color film layer 207 is provided on a side of the second polarizer adjacent to the LC layer, and the insulation layer 208 is interposed between the color film layer 207 and the second polarizer 205. In the embodiment, the color film layer 207 is provided with a color filter and a black matrix BM.

In the present embodiment, the first polarizer 204 and the second polarizer 205 may be wire grid polarizers (WGP).

The WGP may be a metal WGP comprising metal material or metal particles. It should be noted that, the shadow portions in the first polarizer and the second polarizer illustrated in FIG. 2 are grid wires of the WGP, which do not represent the direction of the light transmission axis of the polarizer. Actually, in the metal WGP, the direction of the light transmission axis may be perpendicular to the direction of the grid wire.

In the related arts, the polarizer is generally formed by a polyvinylalcohol (PVA) film. When the light from the backlight module is incident on the polarizer, only one polarizing component of the incident light may pass through while the other polarizing component may be absorbed. In this case, a lot of light may be lost, making the light utilization greatly reduced. In an embodiment of the present disclosure, the WGP comprising metal material or metal particles may be used. When light is incident on the WGP, almost all the light having an electric field vector component oscillating parallel to the wire grid may be reflected due to the oscillating action of the free electrons on the metal surface, while almost all the light having an electric field vector component oscillating perpendicular to the wire grid may be transmitted. The reflected part of light may be reused, thereby improving utilization of light.

In an exemplary embodiment, the WGP having a plurality of light transmission axis directions may be formed by any of the following methods.

I) a metal thin film may be formed using a metal target, and then a WGP having a plurality of light transmission axis directions is formed by an etching process, wherein the direction of the transmission axis is perpendicular to the direction of the wire grid of the WGP.

II) A mixture layer comprising a polymer monomer and metal particles is applied on the first substrate 201 and the second substrate 202, respectively, and then the mixture layer is patterned to form a plurality of wire grids having different directions, wherein the direction of the transmission axis is perpendicular to the direction of the wire grid of the WGP.

III) A mixture layer comprising a polymer monomer and metal particles is applied on the first substrate 201 and the second substrate 202, the mixture layer at corresponding predetermined positions are cured and the substances at other positions are removed, and a pattern comprising protrusions that are spaced apart is formed on the first substrate 201 and the second substrate 202 to form a plurality of wire grids having different directions, wherein the direction of the transmission axis is perpendicular to the direction of the wire grid of the WGP.

The above polymer monomers may comprise acrylic monomers such as methyl acrylate, ethyl acrylate, n-butyl acrylate, n-butyl methacrylate and the like. Of course, other embodiments are also possible.

Figure 3A:
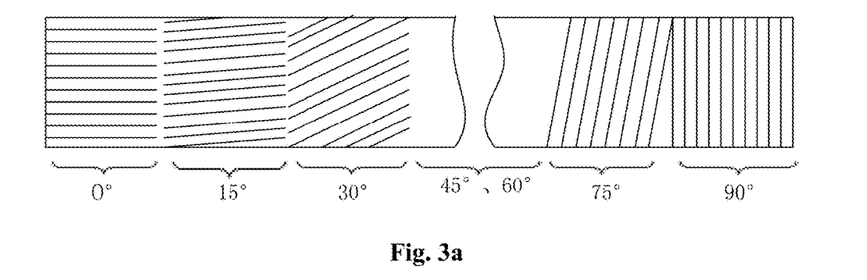
FIGS. 3a and 3b schematically illustrate directions of the grid wires of the first polarizer and the second polarizer according to an embodiment of the present disclosure, wherein directions of light transmission axes of the first polarizer and the second polarizer are perpendicular to directions of the grid wires.
Figure 3B:
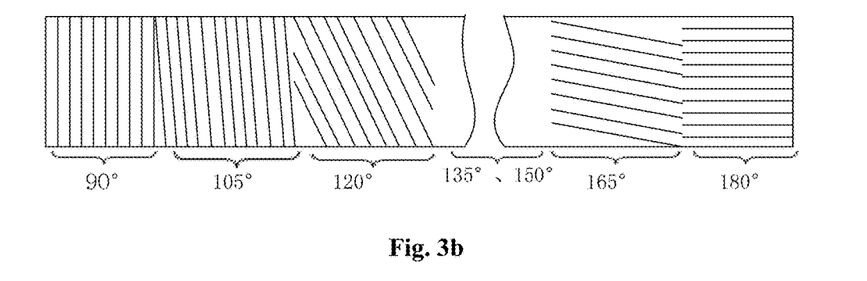

In an alternative embodiment, the first polarizer 204 and the second polarizer 205 may have the light transmission axes in at least three directions. In one embodiment, an angle between the light transmission axis directions of the first polarizer 204 and the second polarizer 205 corresponding to adjacent two pixels may be greater than 0 (zero) degree and smaller than or equal to 15 degrees, and optionally may be 5 degrees. FIGS. 3a and 3b schematically illustrate the directions of the grid wires of the first polarizer and the second polarizer according to an embodiment of the present disclosure, wherein directions of light transmission axes of the first polarizer and the second polarizer are perpendicular to directions of the grid wires. As illustrated in FIG. 3a, the directions of the grid wire of the first polarizer may comprise 0°, 15°, 30°, 45°, 60°, 75° and 90°, and correspondingly, the directions of the light transmission axis of the first polarizer may comprise 90°, 105°, 120°, 135°, 150°, 165° and 180°. As illustrated in FIG. 3b, the directions of the grid wire of the second polarizer may comprise 90°, 105°, 120°, 135°, 150°, 165° and 180°, and correspondingly, the directions of the light transmission axis of the second polarizer may comprise 0°, 15°, 30°, 45°, 60°, 75° and 90°. It can be appreciated that other configurations of the light transmission axis directions of the first polarizer and the second polarizer are possible.

As described above, the first polarizer 204 and the second polarizer 205 have a plurality of different light transmission axis directions, respectively. The LC molecules in the LC layer 203 corresponding to each pixel may be orientated according to the light transmission axis directions of the first polarizer 204 or the second polarizer 205, such that the LC molecules in a same layer (i.e., in one plane) have different orientations, thereby matching the orientations of the LC molecules in the LC layer 203 to the light transmission axis directions of the first polarizer 204 and the second polarizer 205. In the present embodiment, with respect to one pixel, the LC molecules in the LC layer 203 may be orientated parallel to the light transmission axis direction of the first polarizer 204 (i.e., perpendicular to the wire gird direction of the first polarizer 204). As illustrated in FIG. 2, with respect to the pixel R, if the direction of the grid wire of the first polarizer 204 corresponding to the pixel "a" is perpendicular to the plane of the paper (corresponding to the direction of the light transmission axis being parallel to the plane of the paper), the orientation of the LC molecules in the LC layer 203 corresponding to the pixel R is also parallel to the plane of the paper. In this configuration, the LC molecules in a same layer (i.e., in one plane) have different orientations. While viewing the screen from the front or a side of the screen, the viewer may feel a small difference in light leakage. According to this configuration, it is possible to solve the problem that a significant quality difference of the image may be found from different orientations.

In this embodiment, the LC molecules may be orientated using an optical alignment (OA) technique. The basic principle of the OA technique is to orient and align the LC molecules according to the anisotropy due to photochemical reactions of UV-sensitive polymer monomer material. For example, a photosensitive polymer film may be applied on the substrate, and then irradiated with ultraviolet polarized light. Photochemical reactions occur only in the photosensitive group parallel to the direction of polarization of the polarized light, and anisotropy occurs on the alignment film, thereby inducing the orientation of the liquid crystal molecules. It will be appreciated that other alignment techniques are also possible.

In the present embodiment, the display panel further comprises a common electrode and a pixel electrode (not illustrated) that control the rotation of the LC molecules. The common electrode and a pixel electrode may be a surface electrode or a strip electrode.

In the present embodiment, when the pixel electrode is a strip electrode, when the pixel electrode is designed, the orientation of the pixel electrode may be appropriately adjusted such that the direction of the pixel electrode forms a predetermined angle with the orientation of the LC molecules in the LC layer 203, so as to control the rotation of the LC molecules when voltage is applied. In one embodiment, the angle between the direction of the pixel electrode and the orientation of the LC molecules may be about 0 (zero) degree to seven degrees.

For example, in a display panel of a fringe-field switching (FFS) type, the pixel electrode is a strip electrode and the common electrode is a surface electrode, and both the pixel electrode and the common electrode are provided on the side of the first substrate 201. With respect to this type of display panel, the LC molecules may be orientated in a direction coinciding with the light transmission axis direction of the first polarizer, and the direction of the pixel electrode may form a predetermined angle with the orientation of the LC molecules in the LC layer 203, to accommodate the adjustment of the orientation of the LC molecules. In a display panel of an in plane switching (SIP) type, both the pixel electrode and the common electrode are strip electrodes, and both the pixel electrode and the common electrode are provided on the side of the first substrate 201. With respect to this type of display panel, the LC molecules may also be orientated in a direction coinciding with the light transmission axis direction of the first polarizer, and the directions of the pixel electrode and the common electrode may form a predetermined angle with the orientation of the LC molecules in the LC layer 203, to accommodate the adjustment of the orientation of the LC molecules. Of course, this orientation of the LC molecules and the direction of the pixel electrodes are not limited to these two modes, and other modes that can use this orientation of the LC molecules and the direction of the pixel electrodes are also possible.

The pixel described in the embodiments of the present disclosure is a broadly pixel, which may comprise one or more of Red (R) subpixel, Green (G) subpixel and Blue (B) subpixel.

In one example, the light transmission axis directions of the first polarizer corresponding to adjacent two subpixels are different, and the light transmission axis direction of the first polarizer and that of the second polarizer corresponding to the same subpixel are perpendicular to each other. In this configuration, the light transmission axis of the polarizers corresponding to one subpixel is different from the light transmission axis of the polarizers corresponding to another subpixel, thus it is possible to further solve the problem that a significant quality difference of the image may be found from different orientations.

In another example, light transmission axis directions of the first polarizer corresponding to adjacent two pixels (formed by mixing three subpixels of R, G and B), and the light transmission axis direction of the first polarizer and that of the second polarizer corresponding to the same pixel are perpendicular to each other.

It should be noted that in the embodiment illustrated in FIG. 2, the TFT array layer 206 is formed on the first substrate and the color film layer 207 is formed on the second substrate. It should be appreciated that it is also possible that the TFT array layer 206 is formed on the second substrate and the color film layer 207 is formed on the first substrate. In this case, the orientation of the LC molecules and the direction of the pixel electrode may be adjusted accordingly.

Figure 4:
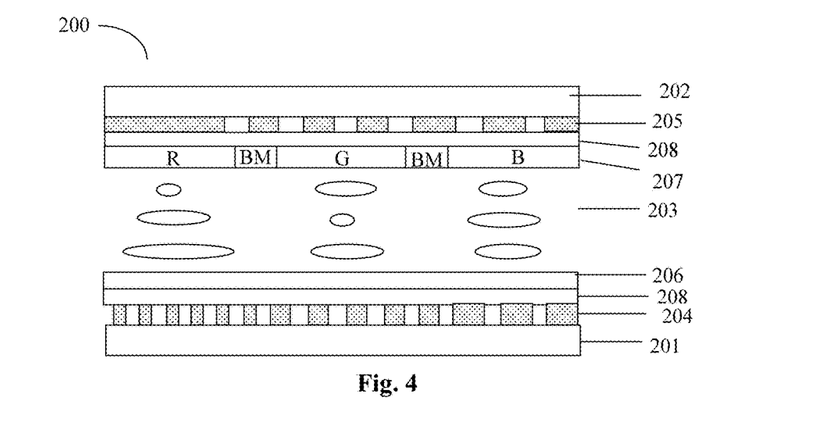
FIG. 4 schematically illustrates a cross sectional view of the display panel according to a second embodiment of the present disclosure.

FIG. 4 schematically illustrates a cross sectional view of the display panel 200 according to a second embodiment of the present disclosure. In this embodiment, the same reference numerals are used for the same parts as those of the first embodiment, and the explanation of the same parts in the first embodiment is also applicable to the present embodiment, and the repeated description will be omitted.

The display panel 200 according to the second embodiment has a structure differs from that of the display panel 200 according to the first embodiment illustrated in FIG. 2 in that the orientation of the LC molecules and the arrangement of the electrode are different from those of the first embodiment. In this embodiment, as illustrated in FIG. 4, an orientation of a layer of the LC molecules in the LC layer 203 closest to the first polarizer 204 is in a same direction as the direction of the light transmission axis of the first polarizer 204, and an orientation of a layer of LC molecules in the LC layer 203 closest to the second polarizer 205 is in a same direction as the direction of the light transmission axis of the second polarizer 205. For example, with respect to the pixel R, the direction of the transmission axis of the first polarizer 204 corresponding to the pixel R (perpendicular to the grid wire in the figure) is in the horizontal direction, and thus the LC molecules adjacent to the first polarizer 204 is orientated in the horizontal direction (parallel to the paper surface); and the direction of the transmission axis of the second polarizer 205 corresponding to the pixel R (perpendicular to the grid wire in the figure) is perpendicular to the surface of the paper, and thus the LC molecules adjacent to the second polarizer 205 is orientated in the direction perpendicular to the paper surface. Other pixels are orientated similarly. In addition, in the present embodiment, the pixel electrode and the common electrode (not illustrated) are provided on the first substrate and the second substrate to produce a vertical electric field for driving the rotation of the LC molecules. The remaining configuration is substantially the same as that in the first embodiment.

For example, in a display panel of a twisted nematic (TN) type, the pixel electrode and the common electrode are surface electrodes and are disposed on the first substrate and the second substrate, respectively, depending on the operation principle of the TN type display panel. The LC molecules are oriented in a helical shape within one pixel. Accordingly, the LC molecules may be orientated according to the present embodiment, such that the LC molecules in a same layer (i.e., in one plane) have different orientations.

Figure 5:
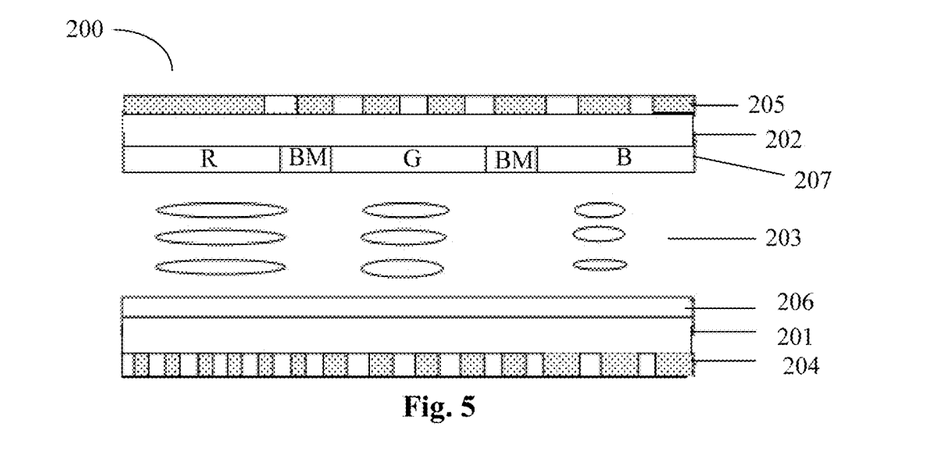
FIG. 5 schematically illustrates a cross sectional view of the display panel according to a third embodiment of the present disclosure.

FIG. 5 schematically illustrates a cross sectional view of the display panel 200 according to a third embodiment of the present disclosure. In this embodiment, the same reference numerals are used for the same parts as those of the first embodiment, and the explanation of the same parts in the first embodiment is also applicable to the present embodiment, and the repeated description will be omitted.

The display panel 200 according to the third embodiment has a structure differs from that of the display panel 200 according to the first embodiment illustrated in FIG. 2 in the positions of the first polarizer 204 and the second polarizer 205. In this embodiment, as illustrated in FIG. 5, the first polarizer 204 is disposed on a side of the first substrate 201 away from the LC layer 203, and the second polarizer 205 is disposed on a side of the second substrate 202 away from the LC layer 203. The remaining configuration is substantially the same as that in the first embodiment.

Figure 6:
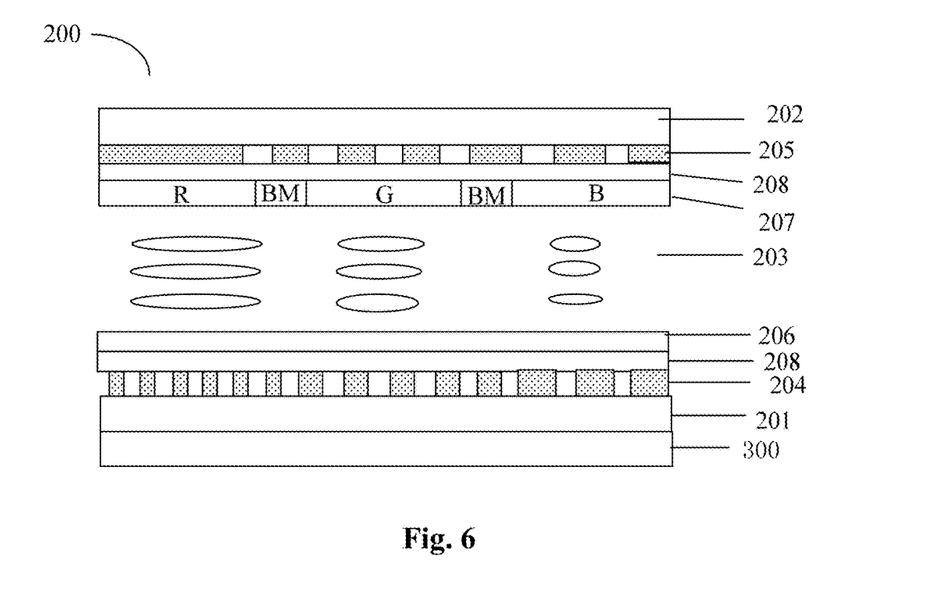
FIG. 6 schematically illustrates a cross sectional view of a display device according to an embodiment of the present disclosure.

As illustrated in FIG. 6, embodiments of the present disclosure further provide a display device comprising any display panel 200 according to the above first, second and three embodiments and a backlight module 300 disposed under the display panel 200. The display device according to the present disclosure comprises the display panel according to the above embodiments, and thus the explanation of the same parts in the above embodiments is also applicable to the present embodiment, and the repeated description will be omitted.

In the present embodiment, it is possible to use any backlight module known in the art, such as a side-light backlight module and a direct-type backlight module.

In the display device according to the present embodiment, the first polarizer and the second polarizer are provided with light transmission axes in different directions, and the directions of the light transmission axes of the first polarizer or the second polarizer corresponding to adjacent pixels are different. While viewing at different orientations, the viewer may see substantially the same image effect, thereby solving the problem that a significant quality difference of the image may be found from different orientations.

Embodiments of the present disclosure further provide a method for manufacturing a display panel. The method may be used for manufacturing the display panel according to the above embodiments, and thus the explanation of the same parts in the above embodiments is also applicable to the present embodiment, and the repeated description will be omitted.

Figure 7:
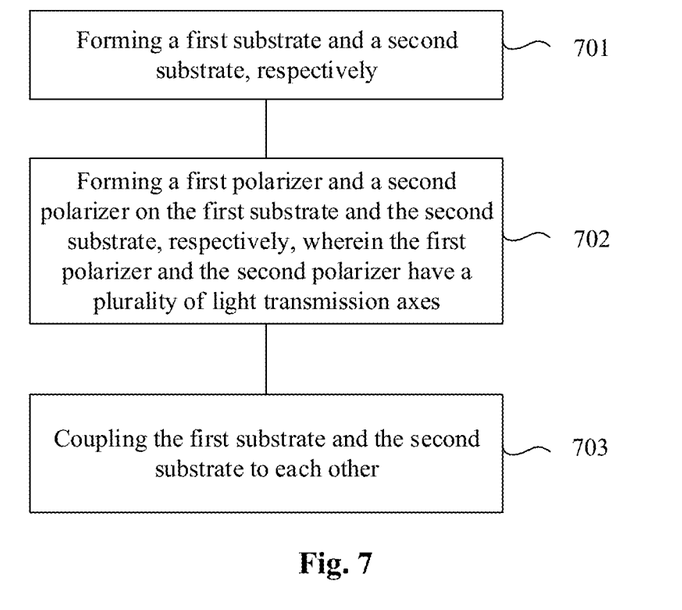
FIG. 7 illustrates a flow chart of a method for manufacturing the display panel according to an embodiment of the present disclosure.

As illustrated in FIG. 7, the method for manufacturing a display panel comprises the steps that follow.

In step S701, a first substrate and a second substrate are formed respectively, wherein the first substrate and the second substrate may be formed of glass or plastic material.

In step S702, a first polarizer and a second polarizer are formed on the first substrate and the second substrate, respectively, wherein the first polarizer and the second polarizer have a plurality of light transmission axes, a direction of the light transmission axis of the first polarizer or the second polarizer corresponding to one pixel is different from that of the first polarizer or the second polarizer corresponding to the pixel adjacent to said one pixel, and the direction of the light transmission axis of the first polarizer and the direction of the light transmission axis of the second polarizer corresponding a same pixel are perpendicular to each other.

In step S703, the first substrate and the second substrate are coupled to each other.

In one embodiment, the above manufacturing method further comprises interposing an LC layer between the first substrate and the second substrate, and orientating the LC molecules in the LC layer according to a direction corresponding to the direction of the light transmission axis of the first polarizer or the second polarizer, such that the LC molecules in a same layer are differently orientated.

In one embodiment, the orientating LC molecules in the LC layer comprises: the LC molecules in the LC layer are orientated such that with respect to one pixel, the LC molecules are orientated in a same direction as that of the light transmission axis of the first polarizer or the second polarizer.

In one embodiment, the orientating LC molecules in the LC layer comprises: the LC molecules in the LC layer are orientated such that with respect to one pixel, an orientation of a layer of the LC molecules in the LC layer closest to the first polarizer is in a same direction as the direction of the light transmission axis of one of the first polarizer and the second polarizer, and an orientation of a layer of LC molecules in the LC layer closest to the second polarizer is in a same direction as the direction of the light transmission axis of the other one of the first polarizer and the second polarizer.

In one embodiment, an angle between the direction of the light transmission axes of the first polarizer and the second polarizer corresponding to one pixel and the direction of the light transmission axes of the first polarizer and the second polarizer corresponding to the pixel adjacent to said one pixel is greater than 0 (zero) degree and smaller than or equal to 15 degrees.

In one embodiment, the method further comprises forming a plurality of pixel electrodes on the first substrate or the second substrate, wherein a direction of the pixel electrode forms a predetermined angle with the orientation of the LC molecules in the LC layer. Optionally, the direction of the pixel electrode forms an angle of about 0 to 7 degrees with the orientation of the LC molecules.

In one embodiment, the display panel may be any of FFS type, IPS type, TN type and vertical alignment (VA) type.

It should be noted that in the description of the present disclosure, the directional or positional relationships indicated by the terms "up", "upper", "low", "lower", "top", "bottom", "between" or the like are based on the directional or positional relationships shown in the drawings, which are provided only for the purpose of facilitating the description and simplification of the description and is not intended or implied that the device or element referred to must have a specific orientation, constructed or operated in a particular orientation. Accordingly, it should not be construed as a limitation of this disclosure. For example, when an element or layer is referred to as being "on" another element or layer, it may be directly on the other element or layer, or there may be an intermediate element or layer; likewise, when the element or layer is referred to as "under" the other element or layer, it may be directly under the other element or layer, or there may be at least one intermediate element or layer; and when the element or layer is referred to as being "between" two elements or two layers, it may be the only element or layer between the two elements or two layers, or there may be more than one intermediate element or layer.

In addition, in the description of the present disclosure, when elements of the present application and its embodiments are introduced, the articles "a", "an", "the" and "said" are intended to indicate the presence of one or more elements. Unless otherwise indicated, the term "a plurality of" means two or more. The terms "include", "comprise", "contain" and "have" are intended to be inclusive, and additional elements other than the listed elements may exist. The terms "first" and "second" are provided for the purpose of descriptions only, and are not to be construed as indicating or implying relative importance.

The foregoing description of the embodiments is provided for the purpose of illustration and description. It is not intended to be exhaustive or to limit the present disclosure. Various elements or features of a particular embodiment are generally not limited to the particular embodiment, but where appropriate, these elements and features are interchangeable and may be used in the selected embodiment, even if no specific presentation or description are provided. Likewise, it can also be changed in many ways. Such variations are not to be regarded as a departure from this disclosure, and all such modifications are intended to be included within the scope of the present application.

What is claimed is:

1. A display panel, comprising:
    a first substrate and a second substrate facing the first substrate;
    a first polarizer provided on the first substrate; and
    a second polarizer provide on the second substrate,
    wherein the display panel comprises a plurality of pixels, the first polarizer and the second polarizer have a plurality of light transmission axes, a direction of the light transmission axis of the first polarizer or the second polarizer corresponding to one pixel is different from that of the first polarizer or the second polarizer corresponding to a pixel adjacent to said one pixel in a row direction of the display panel, and the direction of the light transmission axis of the first polarizer and the direction of the light transmission axis of the second polarizer corresponding a same pixel are perpendicular to each other.

2. The display panel according to claim 1, further comprising a liquid crystal (LC) layer interposed between the first substrate and the second substrate, LC molecules in the LC layer corresponding to each pixel are orientated according to a direction corresponding to the direction of the light transmission axis of the first polarizer or the second polarizer, such that the LC molecules in a same layer are differently orientated.

3. The display panel according to claim 2, wherein with respect to one pixel, a layer of the LC molecules closest to the first polarizer or the second polarizer in the LC layer is orientated in a same direction as that of the light transmission axis of the first polarizer or the second polarizer.

4. The display panel according to claim 2, wherein with respect to one pixel, an orientation of a layer of the LC molecules in the LC layer closest to the first polarizer is in a same direction as the direction of the light transmission axis of one of the first polarizer and the second polarizer, and an orientation of a layer of LC molecules in the LC layer closest to the second polarizer is in a same direction as the direction of the light transmission axis of the other one of the first polarizer and the second polarizer.

5. The display panel according to claim 2, wherein the LC molecules in the LC layer are orientated using an optical alignment technology.

6. The display panel according to claim 2, wherein the first polarizer is disposed at a side of the first substrate adjacent to the LC layer, and the second polarizer is disposed at a side of the second substrate adjacent to the LC layer.

7. The display panel according to claim 2, further comprising a plurality of pixel electrodes provided on the first substrate or the second substrate, wherein a direction of the pixel electrode forms a predetermined angle with the orientation of a layer of the LC molecules in the LC layer closest to the pixel electrode.

8. The display panel according to claim 7, wherein the direction of the pixel electrode forms an angle of 0 to 7 degrees with the orientation of the LC molecules.

9. The display panel according to claim 2, further comprising:
a thin film transistor (TFT) array disposed on a side of one of the first substrate and the second substrate adjacent the LC layer; and
a color filter and a black matrix disposed on a side of the other one of the first substrate and the second substrate adjacent the LC layer.

10. The display panel according to claim 1, wherein the pixel comprises one or more of Red (R) subpixel, Green (G) subpixel and Blue (B) subpixel.

11. The display panel according to claim 1, wherein the first polarizer and the second polarizer are wire grid polarizers.

12. The display panel according to claim 1, wherein an angle between the direction of the light transmission axis of the first polarizer corresponding to one pixel and the direction of the light transmission axis of the first polarizer corresponding to the pixel adjacent to said one pixel is greater than 0 (zero) degree and smaller than or equal to 15 degrees.

13. A display device, comprising the display panel according to claim 1 and a backlight module provided under the display panel.

14. A method for manufacturing a display panel comprising a plurality of pixels, comprising:
forming a first substrate and a second substrate, respectively;
forming a first polarizer and a second polarizer on the first substrate and the second substrate, respectively, wherein the first polarizer and the second polarizer have a plurality of light transmission axes, a direction of the light transmission axis of the first polarizer or the second polarizer corresponding to one pixel is different from that of the first polarizer or the second polarizer corresponding to a pixel adjacent to said one pixel in a row direction of the display panel, and the direction of the light transmission axis of the first polarizer and the direction of the light transmission axis of the second polarizer corresponding a same pixel are perpendicular to each other; and
coupling the first substrate and the second substrate to each other.

15. The method according to claim 14, further comprising:
interposing a liquid crystal (LC) layer between the first substrate and the second substrate; and
orientating LC molecules in the LC layer according to a direction corresponding to the direction of the light transmission axis of the first polarizer or the second polarizer, such that the LC molecules in a same layer are differently orientated.

16. The method according to claim 15, wherein the step of orientating LC molecules in the LC layer comprises:
orientating a layer of the LC molecules closest to the first polarizer or the second polarizer in the LC layer, such that with respect to one pixel, the LC molecules are orientated in a same direction as that of the light transmission axis of the first polarizer or the second polarizer.

17. The method according to claim 15, wherein the step of orientating LC molecules in the LC layer comprises:
orientating the LC molecules in the LC layer, such that with respect to one pixel, an orientation of a layer of the LC molecules in the LC layer closest to the first polarizer is in a same direction as the direction of the light transmission axis of one of the first polarizer and the second polarizer, and an orientation of a layer of LC molecules in the LC layer closest to the second polarizer is in a same direction as the direction of the light transmission axis of the other one of the first polarizer and the second polarizer.

18. The method according to claim 15, wherein the LC molecules in the LC layer are orientated using an optical alignment technology.

19. The method according to claim 15, further comprising:
forming a plurality of pixel electrodes on the first substrate or the second substrate,
wherein a direction of the pixel electrode forms an angle of 0 to 7 degrees with the orientation of a layer of the LC molecules closest to the pixel electrode.

20. The method according to claim 14, wherein an angle between the direction of the light transmission axis of the first polarizer corresponding to one pixel and the direction of the light transmission axis of the first polarizer corresponding to the pixel adjacent to said one pixel is greater than 0 (zero) degree and smaller than or equal to 15 degrees.

* * * * *